UNITED STATES PATENT OFFICE.

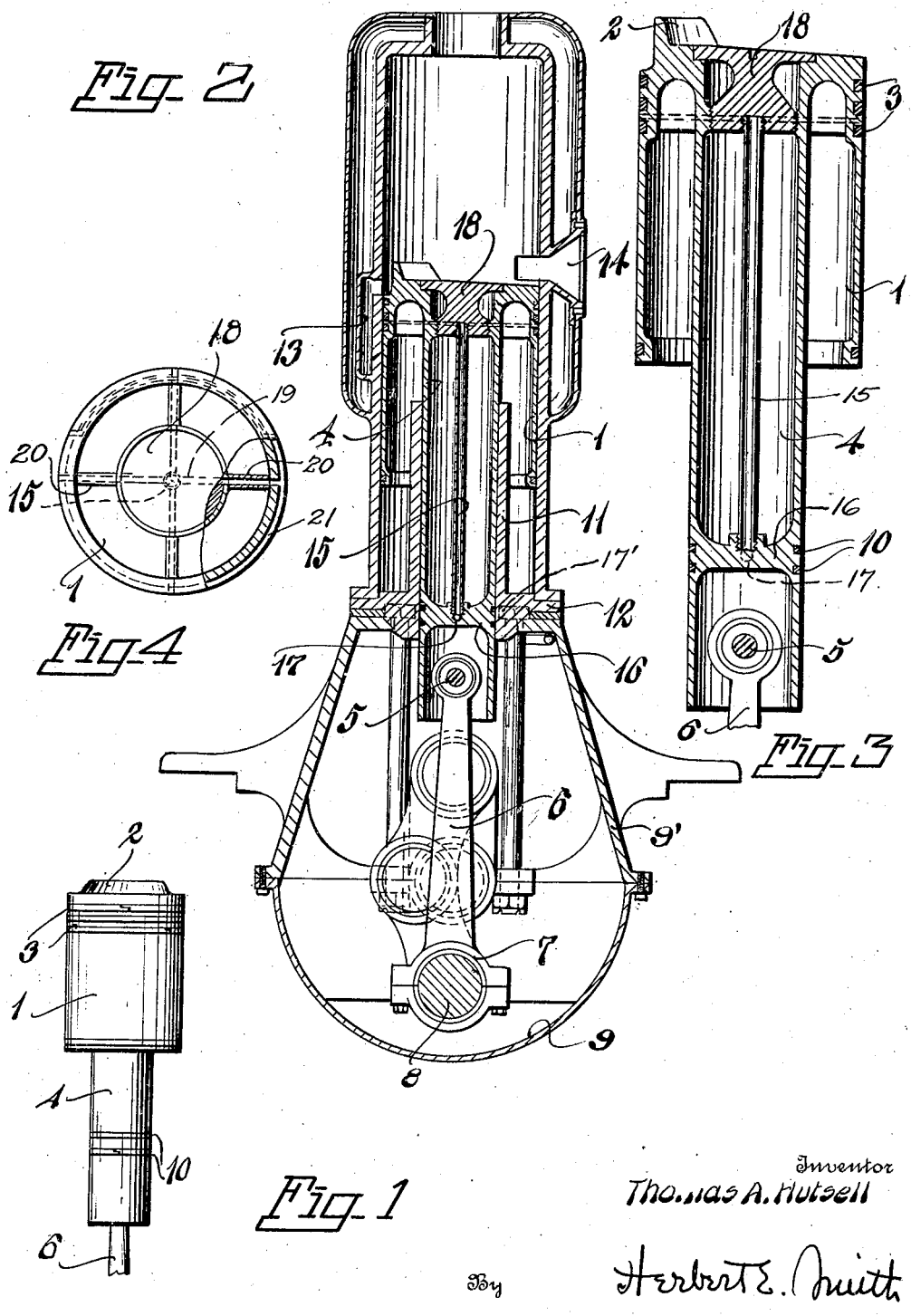

THOMAS A. HUTSELL, OF SPOKANE, WASHINGTON, ASSIGNOR TO THE HUTSELL MOTOR COMPANY, OF SPOKANE, WASHINGTON.

PISTON CONSTRUCTION.

1,378,353. Specification of Letters Patent. Patented May 17, 1921.

Application filed September 24, 1919. Serial No. 326,060.

*To all whom it may concern:*

Be it known that I, THOMAS A. HUTSELL, a citizen of the United States, residing at Spokane, in the county of Spokane and State of Washington, have invented certain new and useful Improvements in Piston Construction, of which the following is a specification.

The present invention relates to improvements in piston construction as adapted for use in internal combustion engines, and the primary object of the invention is the provision of a piston possessing the characteristics of durability and efficiency and embodying features that accomplish these desirable characteristics and the conditions resulting therefrom, and in conjunction with the special form of piston, the cylinder of the engine is constructed with particular relation thereto for rendering comparatively perfect the functions performed by the piston.

The invention consists essentially in certain novel features of the piston construction, and further in combinations and arrangements of parts of the piston with parts or elements of the cylinder of the engine, as will be hereinafter more particularly described and claimed.

The subject matter of the present invention forms a part of a complete internal combustion engine or motor, of which motor, the other parts have been covered in separate and distinct applications for patent, and the piston and cylinder of the present invention embody the best mode I have so far devised for the practical application of the principles of this part of the invention.

Figure 1 is a vertical sectional view of an engine and piston construction embodying my invention.

Fig. 2 is a top plan view of the piston, partly broken away.

Fig. 3 is an enlarged sectional view of the detached piston.

Fig. 4 is a detail elevation of the piston on a small scale.

In the preferred form of my invention as illustrated in the drawings I have shown sufficient of the related parts of the subject matter of this invention to give a clear understanding of the invention claimed herein, and in carrying out the invention I utilize the hollow, cylindrical, piston head 1 made of suitable material and of the proper and accepted shape and dimensions, the lower end of the head being open while the upper end is closed and fashioned on top with a baffle-wall 2 extending part way around the perimeter of the head, to distribute properly the incoming charge of gas to the cylinder of the engine.

The piston head is equipped with the usual annular grooves in its surface for the rings 3, and the head is fashioned with a rigid, integral, hollow stem 4 projecting through the hollow head, from the upper closed end, and adapted to receive, at its lower end, the wrist pin connection 5, for the crank arm 6, with its bearing 7 on the crank shaft 8, of the engine. The usual crank case 9 and engine base (9') are provided for the shaft and connections, and the relation of the piston and its operating parts are shown in Fig. 2 of the invention. In Figs. 1 and 3 the special construction of the piston is best disclosed, the enlarged, hollow, cylindrical head being fashioned with the concentric, tubular stem 4 projecting through and beyond it, and the lower end of the stem is directly connected with the crank shaft through its arm or link 6, thus providing for a stable movement of the piston in which the wear is taken up by the friction rings 3 of the piston head and the similar rings 10 of the tubular stem.

The piston head reciprocates in the cylinder as usual, and a special construction of cylinder is provided for the piston stem in the form of a circular sleeve 11 which projects upwardly within the cylinder from the engine base and is concentric with the cylinder. This cylindrical guide sleeve for the stem is fashioned with an annular flange 12 by means of which the sleeve is secured in position, the flange being located between the lower end of the cylinder and the upper end of the engine base or crank casing, and bolts as usual being employed to secure the parts together. The stem of the piston telescopes within the guide sleeve of the cylinder, and the packing rings 10 bear against the sleeve while the packing rings of the piston head support the piston in the cylinder proper, as the piston reciprocates in its operations as the gas enters through the port 13 to the cylinder and exhausts through port 14 at the opposite side of the cylinder, the admission and exhaust of gases being more clearly set forth in a contemporary application for patent filed herewith.

The oiling feature of the piston in its cylinder is provided for in a novel manner, and this feature is also taken care of in a contemporary application, but the construction of the piston in so far as it involves the oiling of the piston is described herein. In Fig. 3 especially, an oil pipe 15 will be seen extending upwardly from the partition 16 in the lower end of the stem 4, and this pipe receives oil through the radial passage 17 extending through the partition and opening out at the surface of the stem. As the piston and stem reciprocate, this open passage registers at the lower end of the stroke of the piston, with an oil supply port indicated in dotted lines at 17′ Fig. 1 to receive oil, and this supply is conveyed through the vertical oil pipe in the center of the stem and piston, upward to the screw plug 18 that is threaded into a socket or recess in the upper end of the piston head. The plug is fashioned with a pair of diametrically, intersecting, radiating passages 19 and the plug is turned to register with four radiating ducts 20 that extend through the wall of the stem, across the space between the stem wall into and through the wall of the piston head, and these ducts open into the annular groove 21 in the exterior of the piston head. The lubrication is accomplished as the oil passes up through the pipe 15 and is distributed through the passages and ducts to the exterior of the piston head, and thence the action is in usual manner. By the removal of the plug 18 the oil ducts and passages may be made accessible, and the parts may be kept free and cleared for facile movement of the oil so that the friction parts of the stem, piston and cylinder, and sleeve may be lubricated in their several ways. It will be apparent that the piston and its stem as they contact with the cylinder and sleeve, through their respective bearing rings, will be guided and stabilized as they reciprocate within the cylinder and sleeve, thus providing an efficient and durable construction and arrangement of parts.

What I claim is—

1. The combination with the hollow piston head having a concentric, interior, hollow stem closed at its lower end, and a screw plug threaded in the head to close the upper end of the stem, an oil pipe within the stem to receive oil from the exterior of the stem, and said head, sleeve and plug having registering passages for distributing the oil from said pipe to the exterior of the head.

2. The combination with the cylinder and its concentric guide sleeve, of a hollow piston head having a hollow stem reciprocable in the sleeve, and oil distributing means arranged in the hollow stem to receive oil from the exterior of the stem and distribute the oil between the piston head and cylinder, and suitable connections for inlet and exhaust of fuel gases.

3. The combination with the hollow piston head having a concentric, interior hollow stem fashioned with a lower partition, and a screw plug threaded in the head to close the upper end of the hollow stem, an oil pipe fitted in the partition and communicating with the exterior surface of the stem through a radial opening in the partition and the upper end of the pipe being threaded into said plug, and said plug, stem and piston walls provided with passages and ducts to convey oil from the upper end of the pipe to the exterior of the piston head.

In testimony whereof I affix my signature.

THOMAS A. HUTSELL.